(12) United States Patent
Kim et al.

(10) Patent No.: US 7,529,879 B2
(45) Date of Patent: May 5, 2009

(54) INCREMENTAL MERGE METHODS AND MEMORY SYSTEMS USING THE SAME

(75) Inventors: Jin-Hyuk Kim, Seoul (KR); Chan-Ik Park, Seoul (KR); Young-Gon Kim, Gyeonggi-do (KR); Kyong-Ae Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 226 days.

(21) Appl. No.: 10/990,065

(22) Filed: Nov. 16, 2004

(65) Prior Publication Data

US 2006/0004971 A1    Jan. 5, 2006

(30) Foreign Application Priority Data

Jun. 30, 2004    (KR) ................... 10-2004-0050507

(51) Int. Cl.
  *G06F 12/02* (2006.01)
(52) U.S. Cl. .................. 711/103; 711/102; 711/154; 711/165
(58) Field of Classification Search .............. 711/102, 711/103, 154, 165
  See application file for complete search history.

(56) References Cited

U.S. PATENT DOCUMENTS

| | | | |
|---|---|---|---|
| 5,404,485 A | 4/1995 | Ban | ................. 395/425 |
| 5,937,425 A | 8/1999 | Ban | ................. 711/103 |
| 6,125,459 A * | 9/2000 | Andoh et al. | ............... 714/55 |
| 6,381,176 B1 * | 4/2002 | Kim et al. | ........... 365/185.11 |
| 6,725,299 B2 * | 4/2004 | Lie | ................. 710/57 |
| 2003/0110343 A1 | 6/2003 | Hagiwara et al. | |

FOREIGN PATENT DOCUMENTS

| | | |
|---|---|---|
| CN | 1348191 A | 5/2002 |
| EP | 1413959 A1 | 4/2004 |
| JP | 06-222986 | 8/1994 |
| JP | 2003-044351 | 2/2003 |
| KR | 2001 0029171 A | 4/2001 |
| KR | 2002-0092487 A | 12/2002 |
| WO | WO 2004/040584 A1 | 5/2004 |

OTHER PUBLICATIONS

Chinese Office Action for Chinese Patent Application No. 200510079421.9; Date of mailing Aug. 3, 2007.
German Office Action, 10 2005 031 525.9-53; Jul. 31, 2008.

* cited by examiner

*Primary Examiner*—Sanjiv Shah
*Assistant Examiner*—Jae U Yu
(74) *Attorney, Agent, or Firm*—Myers Bigel Sibley & Sajovec, P.A.

(57) ABSTRACT

Memory systems and methods of controlling a flash memory are provided that execute one of a plurality of merge stages of an incremental merge operation responsive to receiving a command to the flash memory. Executing one of a plurality of merge stages may include receiving a command to the flash memory, determining whether the flash memory is executing an incremental merge operation and executing a next merge stage of the incremental merge operation if the flash memory is executing an incremental merge operation.

18 Claims, 7 Drawing Sheets

Before Merging

Block Mapping

| LBN | PBN |
|-----|-----|
| 2   | 0   |
| 3   | 1   |

Log Block Mapping

| Data Block Physical | Log Block Physical |
|---------------------|--------------------|
| 0                   | 5                  |
| 2                   | 6                  |

Log Map Table

| PPN | LPN |
|-----|-----|
| 0   | 2   |
| 1   | 0   |
| ⋮   | ⋮   |

After Merging

| LBN | PBN |
|-----|-----|
| 2   | 7   |
| 3   | 1   |

| Data Block Physical | Log Block Physical |
|---------------------|--------------------|
| 1                   | 0                  |
| 2                   | 6                  |

| PPN | LPN |
|-----|-----|
| 0   | 2   |
| 1   | 0   |
| ⋮   | ⋮   |

INCREMENTAL MERGE METHODS AND MEMORY SYSTEMS USING THE SAME

CLAIM OF PRIORITY

This application is related to and claims priority from Korean Patent Application No. 2004-0050507, filed on Jun. 30, 2004, in the Korean Intellectual Property Office, the disclosure of which is incorporated herein in its entirety by reference.

FIELD OF THE INVENTION

The present invention is related to storages and, in particular, to methods and devices capable of managing a semiconductor memory device that includes non-volatile erasable semiconductor memories such as a flash memory.

BACKGROUND OF THE INVENTION

In recent years, various types of personal computers, such as desktop computers for use in offices and notebook computers for use in mobile environments, have been developed and marketed. Generally, these computer systems include main memory and an external storage device. The external storage device typically has a large memory capacity with a low storage capacity unit cost.

The external storage devices may be conventional hard disk drives (HDD) or floppy disk drives (FDD) that employ disk storage media. These disk storage devices typically provide large memory capacity at relatively low prices and operating costs, but may require highly delicate mechanical technology to perform various operations with a magnetic head, such as a disk seek operation. Accordingly, the disk storage devices may be easily damaged by physical impact and, therefore, may be considered less reliable than other types of memory devices.

In the past, external memory devices of the type that use semiconductor memory as a storage medium, such as SRAM (static random access memory) or DRAM (dynamic random access memory) have not provided a viable alternative to disk storage devices. Although semiconductor type external memory devices have faster processing speeds than disk access times and are less likely to be damaged upon physical impact, inherent drawbacks associated with SRAM and DRAM technology have prevented the use of SRAM and DRAM technology for mass storage.

In general, the price per memory capacity of SRAM is too high to make SRAM cost-effective for mass storage. Furthermore, the additional power required to save data held in DRAM typically increases the operating costs of the external storage device, and the power consumption associated with a DRAM refresh operation makes it difficult to implement DRAM in mobile environments where reduced power consumption is typically desirable.

On the other hand, external semiconductor memory devices that are implemented with flash memory, such as flash EEPROM (electrically erasable read-only-memory) provides a viable alternative to disk storage devices in certain applications. Flash memory devices are non-volatile memory devices that may be programmed more than once. Furthermore, flash memory devices have a simple structure that may be easily implemented. Because flash memory devices typically have low power consumption, are compact and light, and are less likely to be damaged from physical impact, they are often well suited for mobile environments, despite the trade-offs associated with flash memory devices. These trade-offs may include the requirement that an erase operation is performed prior to a programming (or re-write) operation, the requirement for a high voltage (e.g., 12V or 20V) to perform erase operations, and the requirement that a relative large memory unit that may include several KB to several hundreds of KB must be erased simultaneously.

A computer system (hereinafter also referred to as a "host") accesses an external storage device by designating a logical address. The logical address refers to a position among a logical memory space which host software (i.e., an operating system or an application) recognizes, as compared to a physical storage location. Thus, a logical address is converted into a physical address corresponding to a physical memory space in the external storage device in order to access the addressed physical memory space.

Typically, an external storage device that uses flash memory requires additional software, referred to as disk emulation software, to ensure compatibility with the host during an access operation. Compatibility between the host and the external flash storage device during an access operation may be achieved by running a file system such as FTL (flash translation layer). In other words, the host recognizes the external flash memory device as HDD/SRAM and accesses the external flash memory device in the same manner as HDD/SRAM. The FTL connects a flash memory card to a file system that is used by an operating system on a PC and does not allow a write operation more than once (i.e. a re-write) at the same address without erasing the location prior to the re-write.

Functions of the FTL include logical-to-physical address mapping information management, bad block management, data preservation management due to unexpected power interruption, wearing management, and the like. A primary function of the FTL is a mapping technique. Mapping techniques are disclosed in U.S. Pat. No. 5,404,485 entitled "FLASH FILE SYSTEM", U.S. Pat. No. 5,937,425 entitled "FLASH FILE SYSTEM OPTIMIZED FOR PAGE-MODE FLASH TECHNOLOGIES", and U.S. Pat. No. 6,381,176 entitled "METHOD OF DRIVING REMAPPING IN FLASH MEMORY AND FLASH MEMORY ARCHITECTURE SUITABLE THEREFOF", the disclosure of which is hereby incorporated herein by references.

Where a flash memory is accessed in block units, it is divided into a plurality of blocks. Numbers sequentially assigned to the divided blocks are called physical block numbers. A virtual number of a divided block, which a user recognizes, is called a logical block number. Methods for providing the mapping between the logical block number and the physical block number include a block mapping technique, a sector mapping technique, and a log mapping technique. In an FTL using a mapping technique, data of a logically continuous address may be stored at a physically different location. Because the unit of data in an erase operation is typically larger than the unit of data for write (or program) operation, a flash memory typically requires an operation so that data that is not to be erased that is scattered at physically different locations is collected at (i.e. copied to) an empty block in the same address space if it is difficult to write data in any block. This operation is called a merge operation.

The merge operation using the above block, sector and log mapping techniques will be more fully described below. Prior to describing the merge operation, it is assumed that a flash memory is divided into a plurality of memory blocks and that each memory block includes a plurality of pages (or sectors).

"PBN" indicates a physical block number, "PPN" indicates a physical page number, and "LPN" indicates a logical page number.

Block Mapping Technique

Figure 1A:
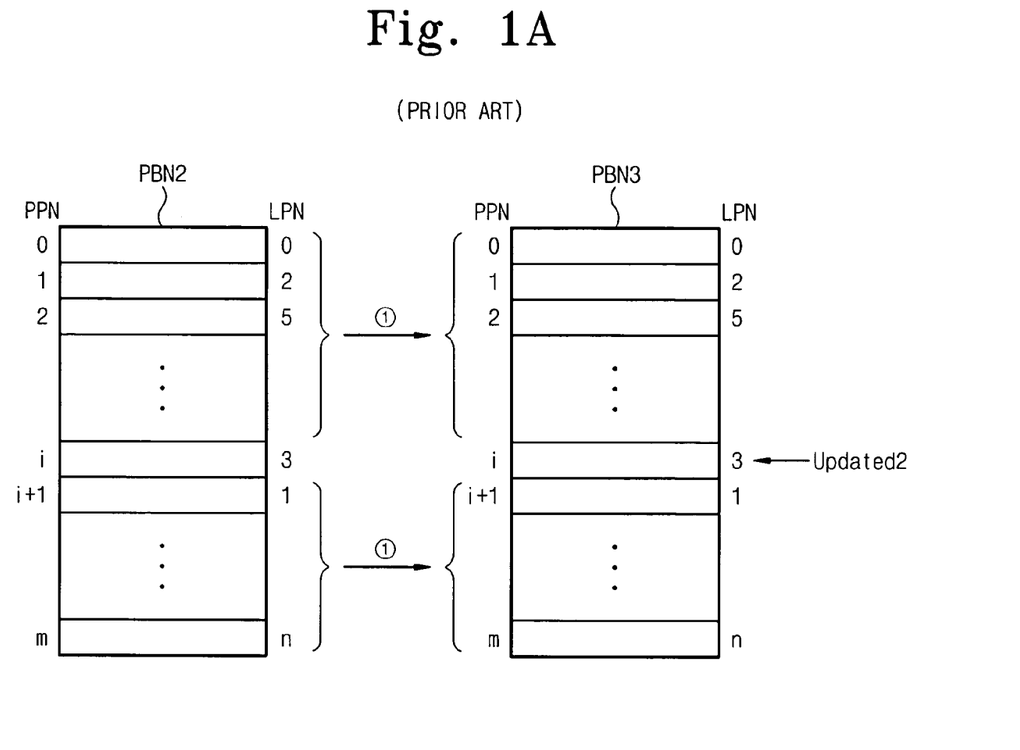
Figure 1B:
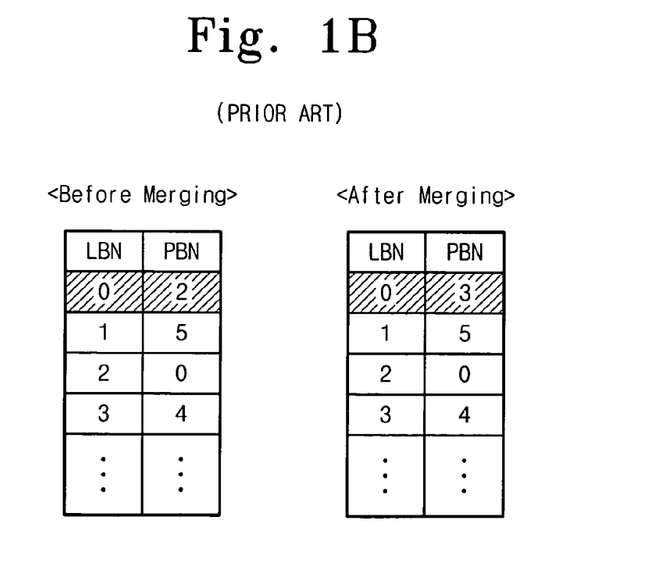

A merge operation according to the block mapping technique will be more fully described with reference to FIGS. 1A and 1B. With the block mapping technique, in case of storing data in any memory block, data is sequentially stored in pages of the memory block. In case of updating/rewriting data an i-th page PPNi of a memory block (e.g., PBN2) whose physical block number is '0', first, data stored in remaining pages excepting the i-th page PPNi is transferred/copied to corresponding pages of an empty memory block (e.g, PBN3). Then, data stored in the page PPNi of the memory block PBN2 is updated/rewritten to an i-th page of the memory block PBN3. Afterward, the memory block PBN0 is erased and is marked as a free memory block. As illustrated in FIG. 1B, after the merge operation is done, a sector mapping table is updated. In other words, a physical memory block corresponding to a logical memory block LBN0 is changed from PBN2 to PBN3. By the block mapping technique, the above merge operation has to be carried out whenever a page where data is stored is updated with different data.

Sector (or Page) Mapping Technique

Figure 2A:
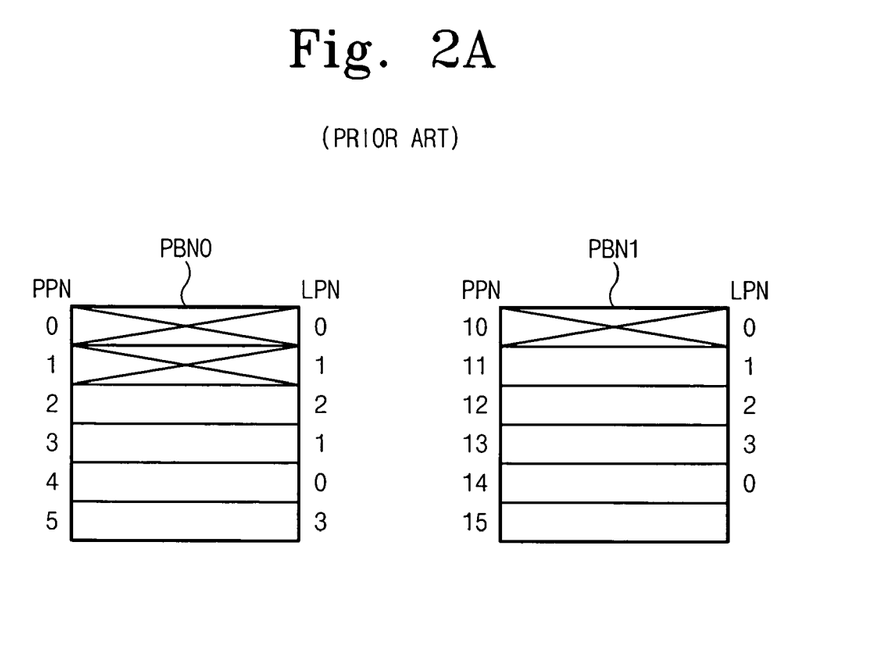
Figure 2B:
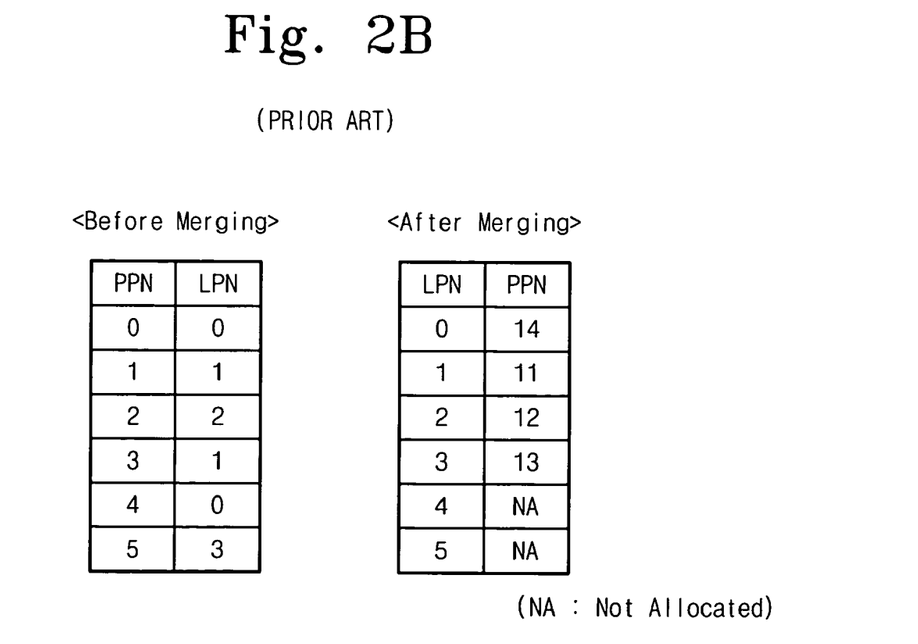

A merge operation according to the sector mapping technique will be more fully described with reference to FIGS. 2A and 2B. By the sector (or page) mapping technique, data is sequentially stored in pages of a memory block. Herein, each page has the same size as the sector, however, one page may consist of a plurality of sectors. For example, data in a logical page LPN0 is stored in a physical page PPN0, data in a logical page LPN1 is stored in a physical page PPN1, and data in a logical page LPN2 is stored in a physical page PPN2. In case of updating data at the logical page LPN1, data of the logical page LPN1 is stored in a physical page PPN3, and the physical page PPN1 is treated as a page where invalid data is stored. Furthermore, in case of updating data at the logical page LPN0, data in the logical page LPN0 is stored in a physical page PPN4, and the physical page PPN0 is treated as a page where invalid data is stored (in FIG. 2A, marked by "X"). If data is stored in all pages, that is, when no free page exists in the memory block PBN0, a merge operation is performed when a write operation to the memory block PBN0 is required. As illustrated in FIG. 2A, only valid data of the memory block PBN0, that is, physical pages PPN2-PPN5 are copied to corresponding pages PPN10-PPN13 of a free memory block PBN1, and data of a logical page LPN0 to which a write operation is required is stored in a physical page PPN14 of the memory block PBN1. At this time, the physical page PPN0 of the memory block PBN1 is treated as a page where invalid data is stored (in FIG. 2A, marked by "X"). Then, the memory block PBN0 is erased. A changed mapping table is managed by FTL, which is changed as illustrated in FIG. 2B.

Log Mapping Technique

Figure 3A:
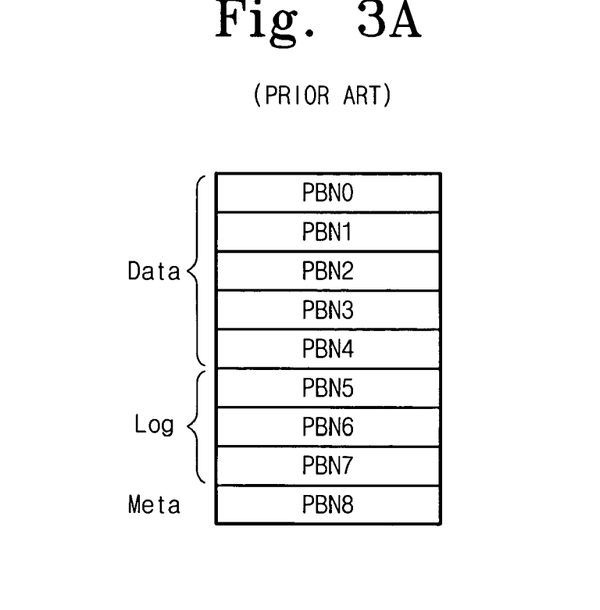
Figure 3B:
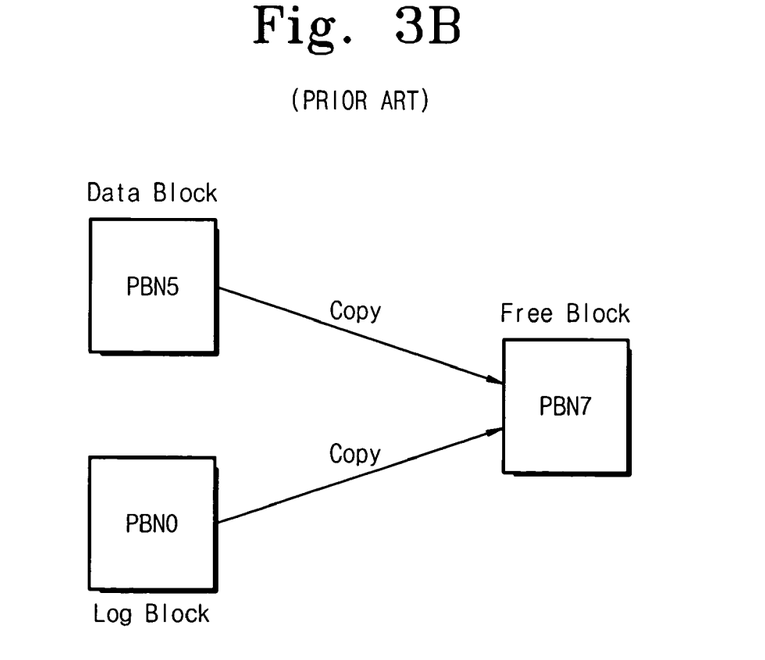
Figure 3C:
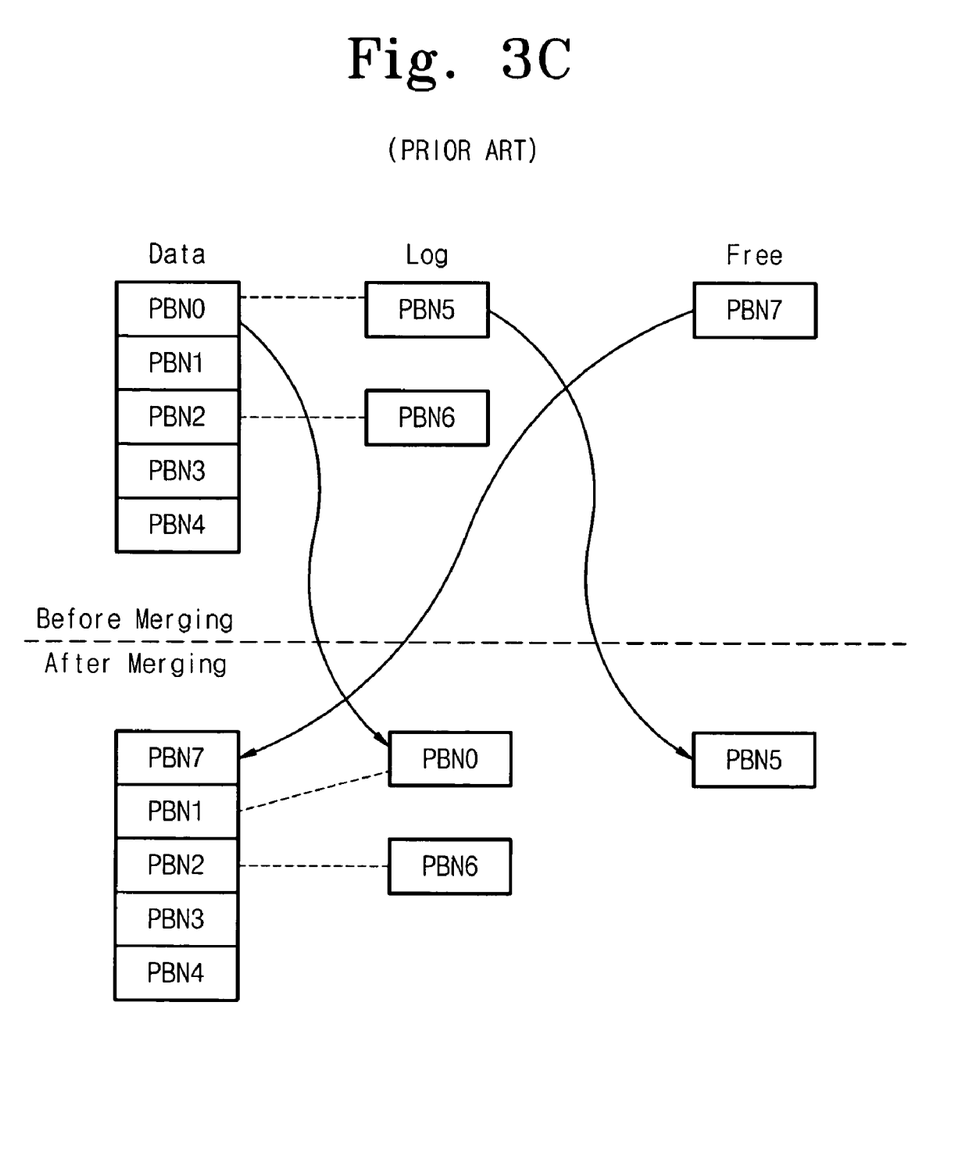
Figure 3D:
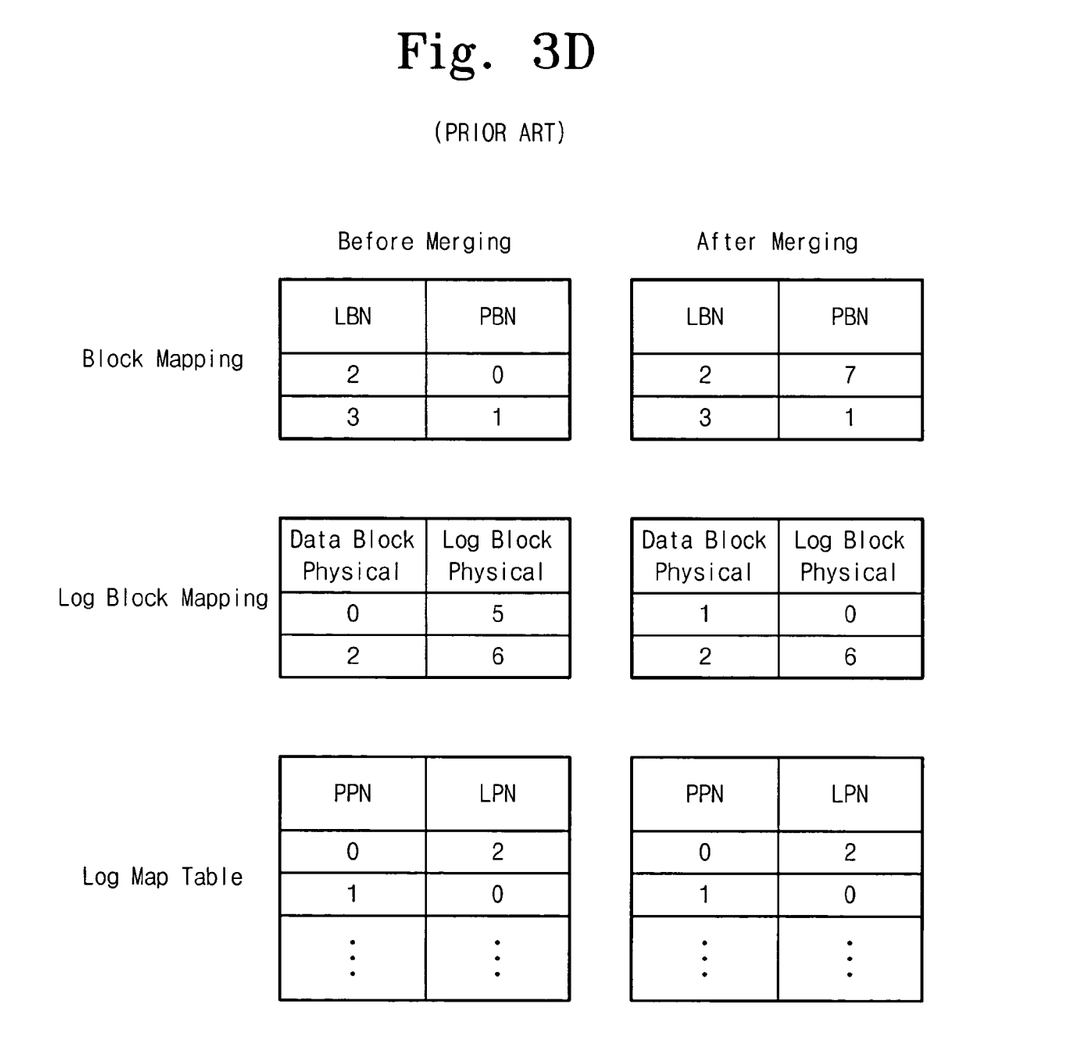

A merge operation using the log mapping technique will be more fully described with reference to FIGS. 3A to 3D. By the log mapping technique, as illustrated in FIG. 3A, memory blocks are divided into a data field, a log field and a meta field. A table of this mapping information is managed by FTL. In accordance with the log mapping technique, memory blocks of the log field are assigned to ones of memory blocks of the data field, respectively. For example, it is assumed that a flash memory comprises nine memory blocks PBN0-PBN8. At a state where memory blocks are not used, memory blocks PBN0-PBN4 are defined as a data field, memory blocks PBN5-PBN7 are defined as a log field, and a memory block PBN8 is defined as a meta field. At this time, memory blocks PBN5 and PBN6 of the log field are assigned to memory blocks PBN0 and PBN2 of the data field, and a memory block PBN7 of the log field is assigned to a free memory block. The above-described mapping information tables (a block mapping table, a log block mapping table, and a log mapping table) are illustrated in FIG. 3D. Each memory block consists of a plurality of pages (or a plurality of sectors).

In case of writing data in a memory block PBN0, data is written to the corresponding memory block PBN5 of the log field to the memory block PBN0, not directly to the memory block PBN0. For example, in case of writing data corresponding to a physical page LPN2 in the memory block PBN0, data is written to a physical page PBN0 in the memory block PBN5 of the log field. Likewise, in case of writing data corresponding to a physical page LPN0 in the memory block PBN0, data is written to a physical page PBN1 in the memory block PBN5 of the log field. In case of writing data in the memory block PBN1, since a memory block of the log field is not assigned to correspond to the memory block PBN1, the following merge operation will be carried out.

First, whether a free memory block exists in the log field (or the data field) is checked. If a free memory block exists in the log field, as illustrated in FIG. 3B, valid data in one of the memory blocks PBN5 and PBN6 of the log field is copied/shifted to the free memory block PBN7 in the log field. Then, valid data in the memory block PBN0 of the data field corresponding to the memory block PBN5 is copied/transferred to the memory block PBN7. This transfer procedure is shown in FIG. 3B. After the memory blocks PBN0 and PBN5 are erased, as illustrated in FIG. 3C, the memory block PBN5 of the log field is assigned to a free memory block, the memory block PBN0 of the data field is assigned to a memory block of the log field, and the memory block PBN7 is assigned to a memory block of the data field. Afterward, data that will be written in the memory block PBN1 is written in the memory block PBN0 of the log field. Mapping tables (block mapping, log block mapping and log mapping tables) before and after the above-described merge operation are illustrated in FIG. 3D.

With the above description, three tables, that is, block mapping, log block mapping and log mapping tables, are needed to manage a merge operation according to the log mapping technique. Mapping information of respective tables is managed by FTL and is stored in a memory block PBN8 of the meta field.

Management of mapping information changed before and after a merge operation follows FTL mapping policy. The above-described merge operation is automatically performed by the need of FTL, and a host does not recognize that this merge operation is carried out. For this, after a command, such as a read command, a write command or an erase command, is outputted to an external storage device including a flash memory and a time elapses, the host resets an external storage device when a response to the command is not received. This operation is called "host time-out." One cause of the host time-out is the above-described merge operation. As a memory block size (or a page size) is increased, a time needed to perform the merge operation becomes longer. This means that the time-out is caused more frequently. In other words, since an external storage device is reset while the merge operation is carried out, it may be difficult to assure reliability of the external storage device.

SUMMARY OF THE INVENTION

Some embodiments of the present invention provide memory systems and methods of controlling a flash memory that execute one of a plurality of merge stages of an incremental merge operation responsive to receiving a command to the flash memory. Executing one of a plurality of merge stages may include receiving a command to the flash memory, determining whether the flash memory is executing an incremental merge operation and executing a next merge stage of the incremental merge operation if the flash memory is executing an incremental merge operation.

In further embodiments of the present invention, the received command is executed if the flash memory is not executing an incremental merge operation or if the received command is a read command. Data for subsequent writing to the flash memory is stored if the flash memory is executing an incremental merge operation. A response is also provided to the host processor that the command has completed.

In additional embodiments of the present invention, a determination is made as to whether the incremental merge operation has completed and the stored data written to the flash memory if the incremental merge operation has completed.

In still further embodiments of the present invention, determining whether the flash memory is executing an incremental merge operation includes evaluating merge state information. The merge state information is also updated responsive to executing the next merge stage.

Particular embodiments of the present invention include determining whether an incremental merge operation is required to execute the received command and executing a first merge stage of the incremental merge operation if an incremental merge operation is required. The determination of whether an incremental merge operation is required to execute the received command may be based on whether a free page exists in at least one memory block of the flash memory. Furthermore, determining whether the flash memory is executing an incremental merge operation may include evaluating merge state information and the merge state information may be updated responsive to executing the first merge stage.

Further embodiments of the present invention include determining if the incremental merge operation has completed and resetting the merge state information if the incremental merge operation has completed. Whether the incremental merge operation has completed may be determined by whether copying of valid data has completed. Whether the incremental merge operation has completed could also be determined by whether all the merge stages of the incremental merge operation have been completed.

Some embodiments of the present invention provide methods and systems for controlling a flash memory by dividing a merge operation into a plurality of merge stages. Each merge stage is completed within a time-out time of a host processor. A respective one of the merge stages is executed responsive to receiving a command from the host processor. The command received from the host processor is selectively executed based on whether a merge operation is in progress and a response is provided to the host processor that the received command has completed so as to provide a response to the host processor within the time-out time of the host processor.

Selectively executing the received command may be provided by performing a read operation if the received command is a read command and storing data for a write command if the received command is a write command and a merge operation is in progress. Furthermore, a determination may be made that the merge operation has completed and the stored data written to flash memory if the merge operation has completed.

In further embodiments of the present invention, executing a respective one of the merge stages includes determining if the received command results in a merge operation and executing a first of the plurality of merge stages if the received command results in a merge operation. Executing a respective one of the merge stages may also include determining if a merge operation is in progress based on merge stage information, determining a next merge stage of the plurality of merge stages, executing the next merge stage of the plurality of merge stages and updating the merge stage information to reflect the execution of the next merge stage.

BRIEF DESCRIPTION OF THE DRAWINGS

FIGS. 1A to 3D are diagrams for describing conventional merge methods.

DESCRIPTION OF EXEMPLARY EMBODIMENTS

The present invention will now be described more fully with reference to the accompanying drawings, in which embodiments of the invention are shown. This invention may, however, be embodied in different forms and should not be construed as being limited to the embodiments set forth herein. Rather, these embodiments are provided so that this disclosure will be thorough and complete, and will fully convey the scope of the invention to those skilled in the art. In the drawings, the size or thickness of layers and regions are exaggerated for clarity. Like numbers refer to like elements. As used herein the term "and/or" includes any and all combinations of one or more of the associated listed items and may be abbreviated as "/".

It will be understood that, although the terms first and second may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, region, layer, or section discussed below could be termed a second element, region, layer, or section, and similarly without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, if a particular logic polarity is used herein to describe embodiments of the present invention, the opposite polarity may also be utilized for the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein In some embodiments of the present invention, it is determined whether a merge operation has to be carried out when a command is received from a host, and if so, a merge operation is incrementally performed. In other words, the merge operation is not completed in a cycle of an input command, but is partially or incrementally performed in cycles of commands subsequently received. Thus, a merge operation is partially carried out during a remaining time interval after the received command is performed, which will be more fully described below. Accordingly, although the time needed for a merge operation may exceed a host time-out time, it is possible to escape the host time-out through the incremental/partial merge operation of the present invention.

Figure 4:
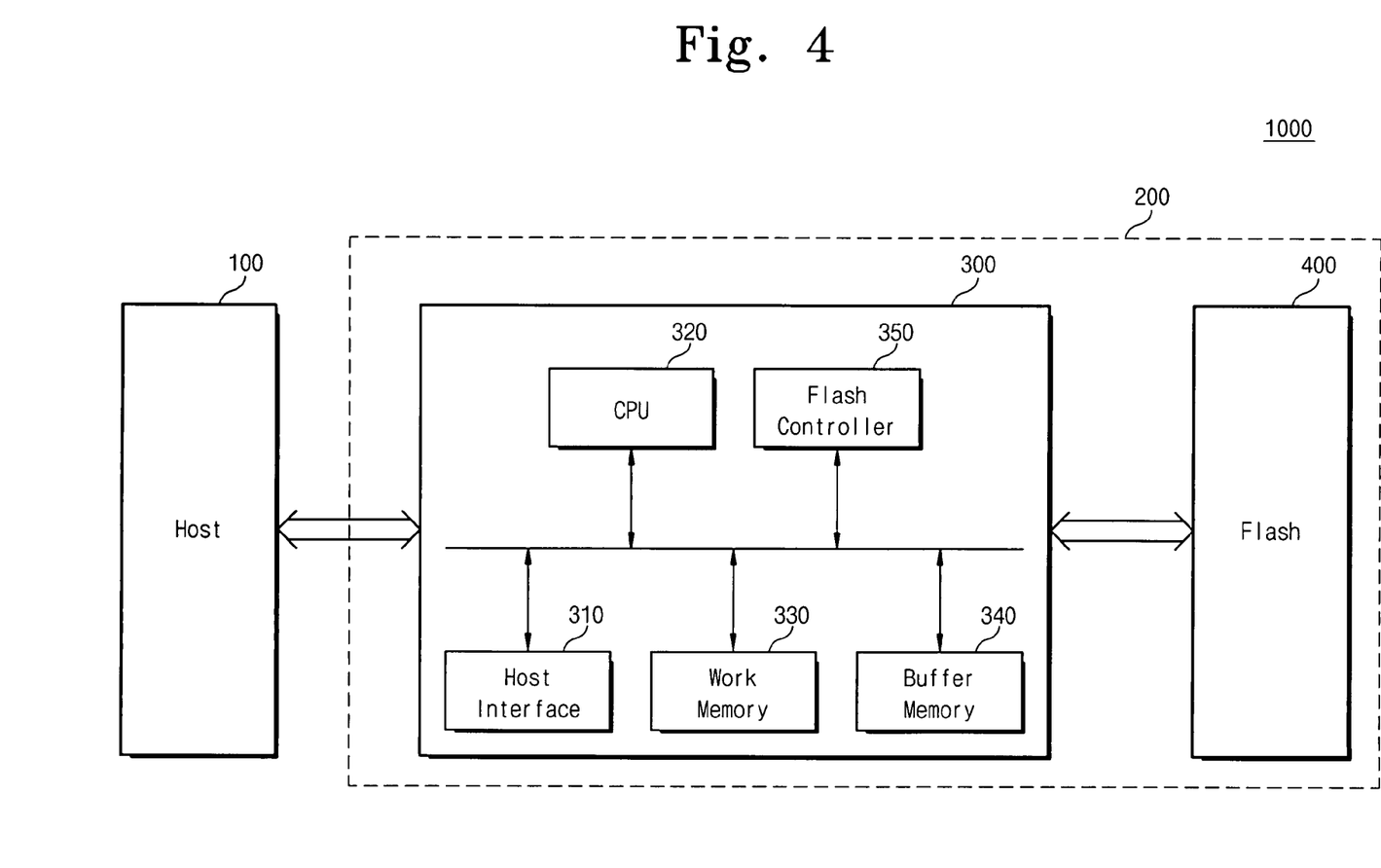
FIG. 4 is a schematic block diagram showing a memory system according to some embodiments of the present invention.

FIG. 4 is a schematic block diagram showing a memory system according to some embodiments of the present invention. Referring to FIG. 4, a memory system 1000 according to some embodiments of the present invention includes a host 100 and an external storage device 200. The external storage device 200 includes an interface device 300 and a flash memory 400. The interface device 300 controls the flash memory 400 when an access to the flash memory 400 is required from the host 100. For example, the interface device 300 controls a read/write/erase operation of the flash memory 400. The interface device 300 manages mapping information of the flash memory 400 so that the host 100 uses the flash memory 400 as a medium that a read/write/erase operation is carried out freely as SRAM/HDD.

The interface device 300 includes a host interface 310, a CPU 320, a work memory 330, a buffer memory 340, and a flash controller 350. The host interface 310 provides an interface function between the external storage device 200 and the host 100, and the CPU 320 controls the overall operation of the external storage device 200. The work memory 330 is used to store software needed to perform FTL functions. The work memory 330 is also used to store mapping information of the flash memory 400. Mapping information of the flash memory 400 is stored in a region (e.g., a meta field) of the flash memory 400, and is automatically loaded onto the work memory 330 at power-up. Also, software needed to do the FTL functions is stored in a region (e.g., a boot code region) of the flash memory 400 and is automatically loaded onto the work memory 330 at power-up.

In some embodiments of the present invention, merge state information indicating an incremental merge state is also stored in the work memory 330. Whenever a command, such as a read command, a write command or an erase command, is transmitted from the host 100, the CPU 320 refers to the merge state information in the work memory 330 and controls an incremental merge scheme that will be described below. The buffer memory 340 is used to store data for storing data in the flash memory 400 or reading data from the flash memory 400. The buffer memory 340, for example, may have a storage capacity that corresponds to a page size of the flash memory 400. Each of the work memory 320 and the buffer memory 330 may be provided as a volatile memory, such as SRAM. The flash controller 350 is configured to control access operations, such as read, write and erase operations, of the flash memory 400 under the control of the CPU 320.

While described herein as separate memories, the work memory 330 and the buffer memory 340 may be provided in one memory, such as SRAM, so as to perform the same functions as described herein with reference to two memories.

The flash memory 400 includes a memory cell array that includes a plurality of memory blocks. Each memory block includes a plurality of pages. One page corresponds either to one sector or to a plurality of sectors. In some embodiments of the present invention, memory blocks of the memory cell array, as set forth above, are divided into a data field, a log field and a meta field. Also, the memory cell array further includes a memory block that stores a boot code and/or FTL. An array architecture of the flash memory 400 is not, however, limited to the architecture as described herein. In other words, the architecture of the memory cell array may be modified depending on the mapping technique of the FTL.

Figure 5:
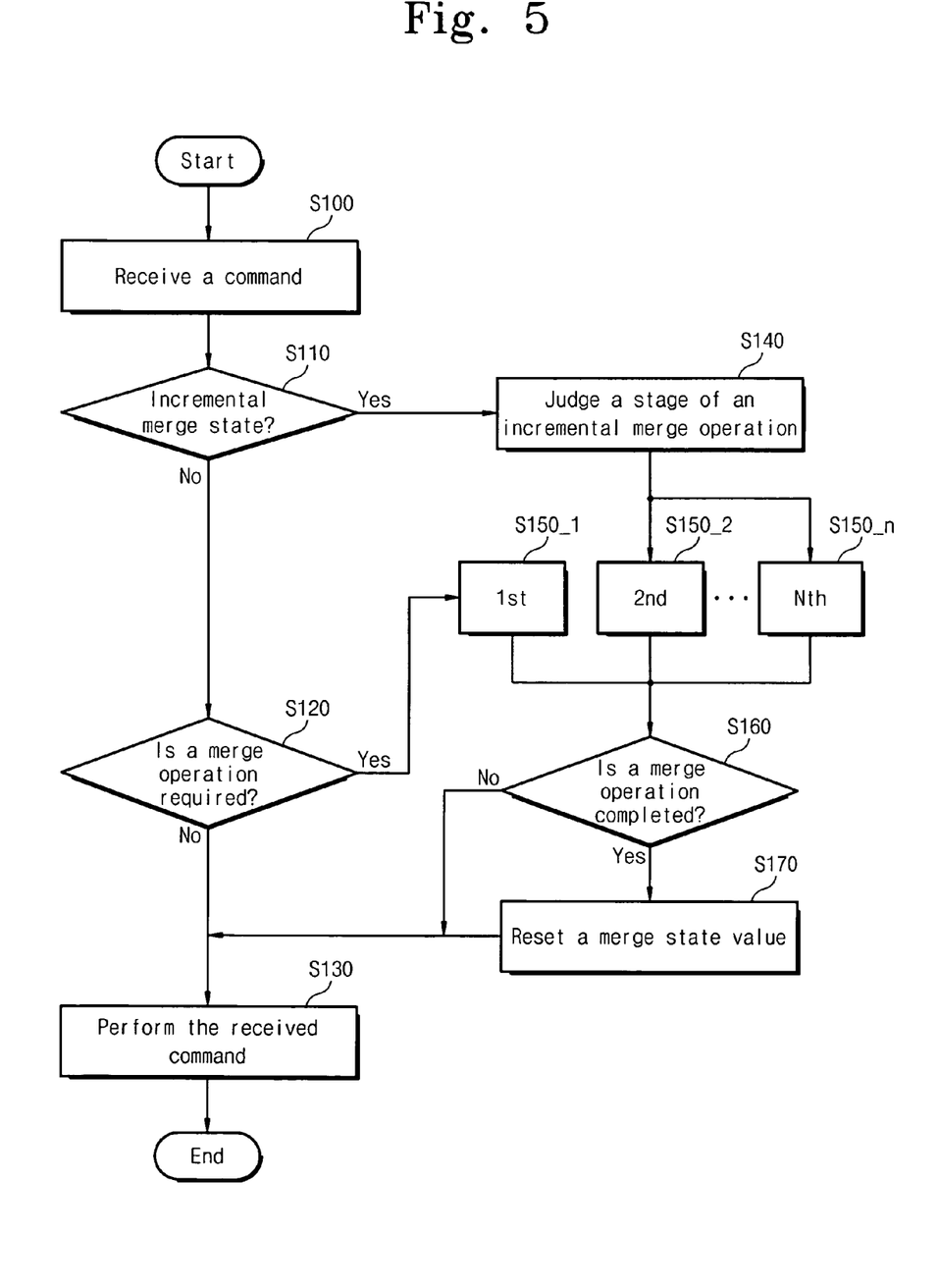
FIG. 5 is a flowchart for describing an incremental merge method according to some embodiments of the present invention.

FIG. 5 is a flowchart illustrating operations for an incremental merge according to some embodiments of the present invention. As described in FIGS. 1 to 3, the merge operation can be performed using various mapping techniques such as a block mapping technique, a sector mapping technique or a log mapping technique. The merge methods according to some embodiments of the present invention are applied to an external storage device and may be utilized with differing mapping techniques applied to the external storage device. Below, incremental merge methods according to some embodiments of the present invention will be more fully described on the basis of a memory system to which the log mapping technique is applied. A conventional merge method using the log mapping technique is described in FIGS. 3A to 3D, and an overall merge operation according to some embodiments of the present invention is carried out in the same manner as the conventional merge operation.

As illustrate in FIG. 5, a read, write or erase command is sent to an external storage device 200 from a host 100 (block S100). When a command is received, a determination is made by the CPU 320 as to whether the external storage device 200 is in an incremental merge state on the basis of merge state information in the work memory 330 (block S110). If the external storage device 200 is not in an incremental merge state (block S110), a determination is made as to whether the received command results in a merge operation to memory blocks in the log field being carried out (block S120). Whether the merge operation is to be carried out may be determined based on whether a free page(s) exists in the memory blocks of the log field. Whether a free page(s) exists in the memory blocks of the log field may be determined by use of a mapping table. The threshold number of free pages at which a merge operation is performed may vary depending on the particular application. For example, a merge operation can be performed when one free page exists in a memory block. The free page number may be changed according to a flash memory capacity and a memory system to which the present merge scheme is applied.

If no merge operation is required (block S120), the operation corresponding to the received command is performed (block S130). After the operation corresponding to the received command is performed, the external storage device 200 informs the host 100 that the operation corresponding to the received command has completed. As well understood to one skilled in the art, if the operation corresponding to the received command is performed within a given time, such as a time-out time, the host does not time-out. If the operation corresponding to the received command is not performed within the time-out time, the host times out and the external storage device 200 is reset.

Returning to block S120, if the command results in a merge operation to the memory block(s) being performed, a first stage of the incremental merge operation is performed (block S150_1). The merge operation, as described above, is divided into at least two stages. For example, the merge method according to the log mapping technique generally includes preparing a free memory block; copying valid data in a memory block of a log field to the free memory block; copying valid data in a memory block of a data field to the free memory block; and updating mapping information. The copying of the valid data to the free memory block can be divided into two or more steps based on a page size of the flash memory.

In particular embodiments of the present invention, the first stage includes preparing a free memory block; and copying valid data in a memory block of a log field to the free memory block, and a second stage includes copying valid data in a memory block of a data field to the free memory block; and updating mapping information. Considering that the merge operation copies valid data to a free memory block, as a memory block size or capacity increases, the time needed to copy valid data increases. In this case, the number of stages of the incremental merge operation may also increased such that each stage completes within the time-out time of the host. Thus, the incremental merge operation according to embodiments of the present invention is carried out in two or more stages.

After the first stage of the incremental merge operation (block S150_1), merge state information is updated in the work memory 330 to indicate the next stage of the merge operation to be performed. After the first stage of the incremental merge operation has completed, it is determined whether the incremental merge operation has completed (block S160). For example, it may be determined that the incremental merge operation has completed when stages S150_1 through S150_n are all performed. If the merge operation has not completed (block S160), operations continue with an operation corresponding to the received command being performed (block S130) and the external storage device 200 informs the host 100 that the corresponding operation to the received command has completed. If the merge operation has completed (block S160), the merge state information value in the work memory 330 is reset to indicate that the incremental merge operation has completed or ended (block S170). In other words, the external storage device 200 is released from an incremental merge state. The operation corresponding to the received command is also performed (block S130) and the external storage device 200 informs the host 100 that the operation corresponding to the received command has completed.

When a subsequent command is sent to the external storage device 200 from the host 100, the CPU 320 determines whether the external storage device 200 is in an incremental merge state (block S110), based on the merge state information in the work memory 320. Because the first stage of the incremental merge operation has been performed as a result of a previous input command, the external storage device 200 is in an incremental merge state and the CPU 320 determines the next stage of the incremental merge operation to be performed (block S140) based on the merge state information in the work memory 330. The next stage of the incremental merge operation (one of blocks S150_2 through S150_n) is then performed. After the next stage has completed in the same manner as described above, the merge state information in the work memory 330 is updated to indicate a next stage of the incremental merge operation. It is then determined whether the merge operation has completed (block S160). If the merge operation has not completed (block S160), operations continue with an operation corresponding to the received command being performed (block S130) and the external storage device 200 informs the host 100 that the corresponding operation to the received command is completed. If the merge operation has completed (block SI 60), the merge state information value in the work memory 330 is reset to indicate that the incremental merge operation has completed or ended (block S170). In other words, the external storage device 200 is released from an incremental merge state. The operation corresponding to the received command is also performed (block SI 30) and the external storage device 200 informs the host 100 that the corresponding operation to the received command has completed. These operations are repeated with each received command until the incremental merge operation completes.

Once the external storage device 200 enters the incremental merge state, it remains in the merge state until all the stages of the incremental merge operation are performed. Whether the incremental merge operation has completed may be determined in several different ways. For example, it is possible to determine whether an incremental merge operation has ended, based on whether valid data has all been copied to a free memory block. In this case, the external storage device 200 exits the incremental merge state. Whether the incremental merge operation has completed may also be determined by use of merge state information in the work memory 330. Other techniques for determining that an incremental merge operation has completed may also be utilized.

The operation corresponding to the received command that is performed at block S130 may vary depending on the received command and whether the external storage device 200 is in a merge state. When the received command is a read or an erase command, the corresponding operation to the received command is performed irrespective of whether an incremental merge operation is being performed. The CPU 320 may know the addresses affected by the merge operation and perform the read or erase operation accordingly. Thus, for example, the CPU 320 may read the data from the appropriate one of the work memory 330, the buffer memory 340 and the flash memory 400 depending on where the valid data to be read is stored if a merge operation is in progress (i.e. the external storage device 200 is in a merge state).

When the received command is a write command, if an incremental merge operation is being performed, the corresponding write to flash memory is delayed until the merge operation is completed. However, the external storage device 200 may signal the host 100 that the command has completed. While the corresponding operation to the received command write is not immediately performed, data received with the write command is temporarily stored in the buffer memory 340 to be written when the merge operation is completed and the external storage device 200 responds to the host 100 so that the host 100 does not time-out. The merge stage of the incremental merge operation is performed but the write operation is delayed until the merge operation completes. If a next write command is received, a next stage of the incremental merge operation is carried out. Data received with the subsequent write command is also temporarily stored in the buffer memory 340 and the external storage device 200 responds to the host 100 so that the host 100 does not time-out. These operations may be repeated twice or more until the buffer memory 340 is filled with data to be written or the data is written after the incremental merge operation is completed. After the incremental merge operation has completed, data stored in the buffer memory 340 is stored in the flash memory 400.

Thus, the various of the components of the interface device 300 when carrying out the operations of FIG. 5 may provide means for dividing a merge operation into a plurality of merge stages, wherein each of the merge stages is completed within a time-out time of a host processor, means for executing a respective one of the merge stages responsive to receiving a command from the host processor, means for selectively executing the command received from the host processor based on whether a merge operation is in progress and means for responding to the host processor that the received command has completed so as to provide a response to the host processor within the time-out time of the host processor.

While operations according to some embodiments of the present invention have been described as responsive to receiving a command, in some embodiments of the present invention a timer may also be utilized such that if a command is not received from the host 100 within the timer time period, the next merge stage is performed. Thus, even if commands are not received the merge operation may be completed. The timer could be reset upon receipt of a command.

While the present invention has been particularly shown and described with reference to particular embodiments thereof, it will be understood by those of ordinary skill in the art that various changes in form and details may be made therein

What is claimed is:

1. A method of controlling a flash memory, the method comprising:
   receiving a command to the flash memory from a host processor;
   determining whether the flash memory is executing an incremental merge operation for copying data that is not to be erased to another block of the flash memory, the incremental merge operation including a plurality of merge stages, wherein determining whether the flash memory is executing an incremental merge operation comprises evaluating merge state information that indicates a next merge stage to be performed;
   executing the next merge stage of the plurality of merge stages responsive to determining that the flash memory is executing the incremental merge operation, wherein the next merge stage is completed within a time-out time of the host processor, and wherein the plurality of merge stages of the incremental merge operation is not completed within the time-out time;
   determining whether an incremental merge operation is required to execute the received command;
   executing a first merge stage of the incremental merge operation if an incremental merge operation is required;
   updating the merge state information responsive to executing the first merge stage;
   executing the received command if the flash memory is not executing an incremental merge operation or if the received command is a read command;
   storing data for subsequent writing to the flash memory if the flash memory is executing an incremental merge operation; and
   responding to a host processor that the command has completed.

2. The method of claim 1, further comprising:
   determining if the incremental merge operation has completed; and
   writing the stored data to the flash memory if the incremental merge operation has completed.

3. The method of claim 1, further comprising:
   updating the merge state information responsive to executing the next merge stage.

4. The method of claim 3, further comprising:
   determining if the incremental merge operation has completed; and
   resetting the merge state information if the incremental merge operation has completed.

5. The method of claim 4, wherein determining whether the incremental merge operation has completed is determined by whether copying of valid data has completed.

6. The method of claim 4, wherein determining whether the incremental merge operation has completed is determined by whether all the merge stages of the incremental merge operation have been completed.

7. The method of claim 1, wherein determining whether an incremental merge operation is required to execute the received command is based on whether a free page exists in at least one memory block of the flash memory.

8. A method of controlling a flash memory comprising:
   dividing a merge operation into a plurality of merge stages to define an incremental merge operation for copying data that is not to be erased to another block of the flash memory, wherein the plurality of merge stages of the incremental merge operation is not completed within a time-out time of a host processor;
   executing a respective one of the plurality of merge stages responsive to receiving a command from the host processor, wherein the one of the plurality of merge stages is completed within the time-out time of the host processor selectively executing the command received from the host processor based on whether the incremental merge operation is in progress; and
   responding to the host processor that the received command has completed so as to provide a response to the host processor within the time-out time of the host processor,
   wherein executing a respective one of the plurality of merge stages comprises:
   determining if the received command results in a merge operation; and
   executing a first of the plurality of merge stages if the received command results in a merge operation, and
   wherein executing a respective one of the plurality of merge stages further comprises:
   determining if a merge operation is in progress based on merge stage information that indicates a next merge stage of the plurality of merge stages to be performed;
   determining the next merge stage of the plurality of merge stages;
   executing the next merge stage of the plurality of merge stages; and
   updating the merge stage information to reflect the execution of the next merge stage.

9. The method of claim 8, wherein selectively executing the received command comprises:
   performing a read operation if the received command is a read command; and
   storing data for a write command if the received command is a write command and a merge operation is in progress.

10. The method of claim 9, further comprising:
    determining that the merge operation has completed; and
    writing stored data to flash memory if the merge operation has completed.

11. A memory system comprising:

a flash memory; and an interface device configured to receive a command from a host processor, determine whether the memory system is executing an incremental merge operation for copying data that is not to be erased to another block of the flash memory, and execute a next merge stage of a plurality of merge stages of the incremental merge operation responsive to determining that the memory system is executing the incremental merge operation, wherein the next merge stage is completed within a time-out time of the host processor, and wherein the plurality of merge stages of the incremental merge operation is not completed within the time-out time, wherein the interface device is configured to execute the received command if the memory system is not executing an incremental merge operation or if the received command is a read command, store data in a buffer memory for subsequent writing to the flash memory if the memory system is executing an incremental merge operation and respond to the host processor that the command has completed, wherein the interface device is further configured to determine whether an incremental merge operation is required to execute the received command and execute a first merge stage of the incremental merge operation if an incremental merge operation is required, and wherein the interface device is further configured to determine whether the flash memory is executing an incremental merge operation by evaluating merge state information that indicates the next merge stage of the incremental merge operation to be performed in a work memory and update the merge state information responsive to executing the first merge stage.

12. The system of claim 11, wherein the interface device is further configured to determining if the incremental merge operation has completed and write the stored data to the flash memory if the incremental merge operation has completed.

13. The system of claim 11, wherein the interface device is further configured to determine whether the flash memory is executing an incremental merge operation by evaluating merge state information that indicates the next merge stage of the incremental merge operation to be performed stored in a work memory and update the merge state information responsive to executing the next merge stage.

14. The system of claim 13, wherein the interface device is further configured to determine if the incremental merge operation has completed and resetting the merge state information if the incremental merge operation has completed.

15. The system of claim 14, wherein the interface device is further configured to determine whether the incremental merge operation has completed by determining whether copying of valid data has completed.

16. The system of claim 14, wherein the interface device is further configured to determine whether the incremental merge operation has completed by determining whether all the merge stages of the incremental merge operation have been completed.

17. The system of claim 11, wherein the interface device is further configured to determine whether an incremental merge operation is required to execute the received command based on whether a free page exists in at least one memory block of the flash memory.

18. A system for controlling a flash memory comprising:

means for dividing a merge operation into a plurality of merge stages to define an incremental merge operation for copying data that is not to be erased to another block of the flash memory, wherein the plurality of merge stages of the incremental merge operation is not completed within a time-out time of a host processor;

means for executing a respective one of the plurality of merge stages responsive to receiving a command from the host processor, wherein the one of the plurality of merge stages is completed within the time-out time of the host processor;

means for selectively executing the command received from the host processor based on whether the incremental merge operation is in progress; and means for responding to the host processor that the received command has completed so as to provide a response to the host processor within the time-out time of the host processor, wherein the means for executing a respective one of the plurality of merge stages comprises:

means for determining if the received command results in a merge operation; and means for executing a first of the plurality of merge stages if the received command results in a merge operation, and wherein the means for executing a respective one of the plurality of merge stages further comprises:

means for determining if a merge operation is in processes based on merge stage information that indicates a next merge stage of the plurality of merge stages to be performed;

means for determining the next merge stage of the plurality of merge stages;

means for executing the next merge stage of the plurality of merge stages; and means for updating the merge stage information to reflect the execution of the next merge stage.

* * * * *